Aug. 8, 1933.  F. E. FISHER  1,921,665
SPRING SHACKLE
Filed Nov. 21, 1932
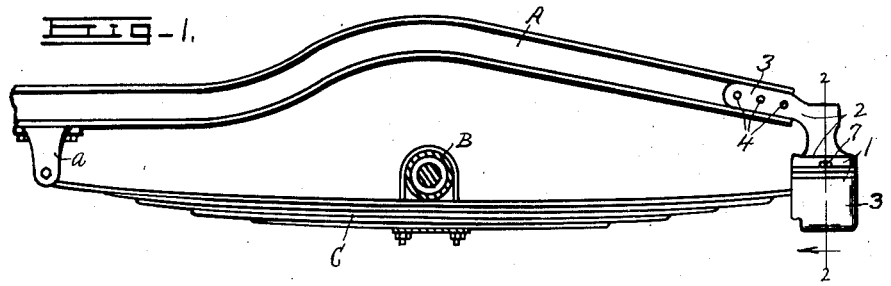
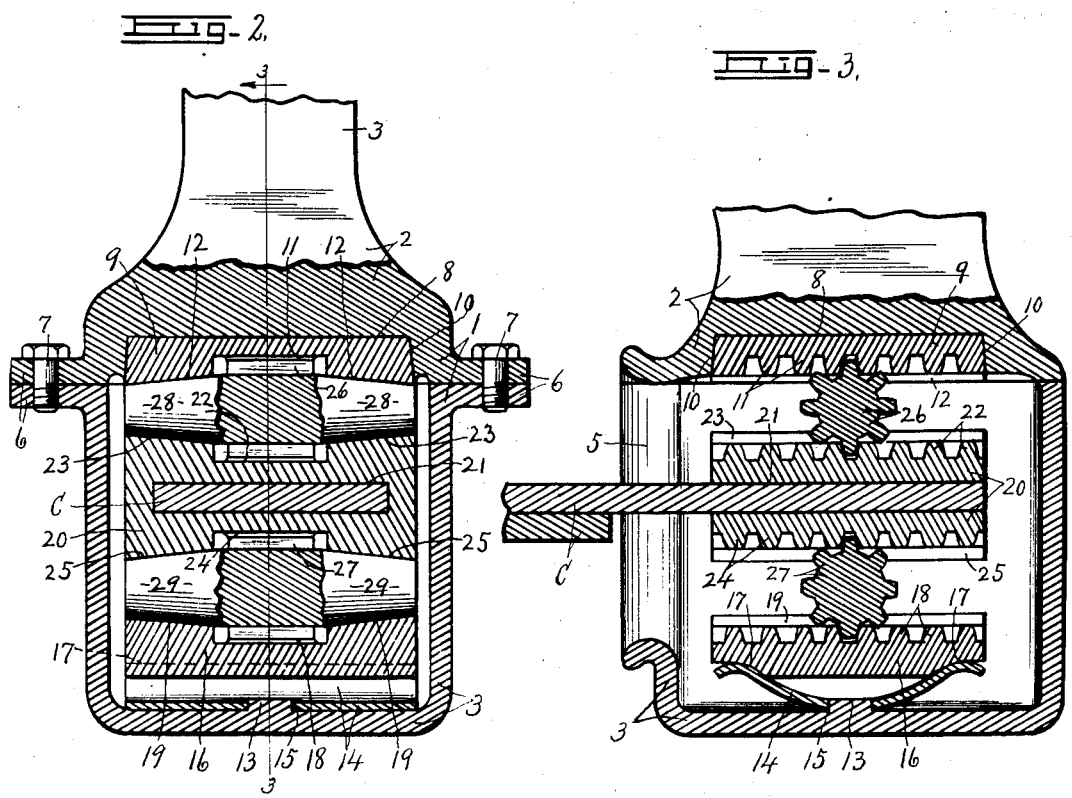
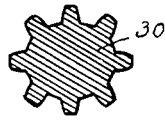
WITNESS
INVENTOR
BY
ATTORNEYS Patented Aug. 8, 1933

1,921,665

UNITED STATES PATENT OFFICE 1,921,665

SPRING SHACKLE

Frank E. Fisher, Elmira, N. Y.

Application November 21, 1932
Serial No. 643,636

4 Claims. (Cl. 267—54)

This invention relates to a spring shackle of the class set forth in my Patent No. 1,861,470 dated June 7th, 1932, in so far that it provides the chassis frame with suitable bearings upon which the ends of the springs are free to move endwise as distinguished from the usual swinging link shackles.

The swinging link shackle necessarily requires the use of two pivotal bolts and usually a pair of links for each spring, and owing to the frequency of vibration these links and bolts soon become worn to such an extent as to cause more or less rattle unless they are as frequently tightened, whereas in my patent referred to the ends of the springs are slidable endwise upon suitable rocking bearings capable of self-adjustment to different angles of the spring, thereby eliminating to a considerable extent the difficulties attending the use of the swinging link shackles.

I have found, however, that this improvement may be carried still further by the use of rack and pinion bearings between the ends of the springs and housings therefor and also by rigidly securing the housings to the chassis frame, thus permitting the ends of the springs to freely reciprocate endwise in their respective housings without liability of overstraining or buckling the springs lengthwise.

The main object of the present invention is to provide simple and comparatively inexpensive spring shackles of this type in which the end of the spring is adapted to move endwise with greater ease and with less friction, noise and wear than has heretofore been practiced and at the same time to enable it to be used an indefinite period of time without lubrication.

Another object is to establish a positive rolling connection between the end of the spring and shackle through the medium of hardened non-resilient steel or equivalent racks and pinions capable of maintaining operative relation in all positions of relative movement of the shackle and spring.

Another object is to provide simple means for yieldingly holding these racks and pinions in operative engagement to compensate for wear and thereby to reduce to a minimum the noise incidental to the operation.

Other objects and uses relating to specific parts of the device will be brought out in the following description.

In the drawing:—

Figure 1 is a side elevation of a portion of a chassis frame, spring and axle and my improved shackle for receiving the end of the spring.

Figure 2 is an enlarged transverse vertical sectional view through the shackle, taken on line 2—2, Figure 1.

Figure 3 is an enlarged longitudinal sectional view of the same shackle taken in the plane of line 3—3, Figure 2.

Figure 4 is a transverse sectional view of an elliptical pinion adapted to be used in place of either of the circular pinions shown in Figures 2 and 3.

In order that the invention may be clearly understood, I have shown a portion of a chassis frame —A—, an axle —B— and a semi-elliptic spring —C— extending lengthwise of the frame and secured intermediate its ends to the axle —B—. One end of the spring is pivotally attached to a lug —a— which, in turn, is rigidly secured to the underside of the frame —A— to extend downwardly therefrom, as shown in Figure 1.

The other end of the spring is extended into a housing —1— which is composed of upper and lower sections —2— and —3— together with suitable racks and pinions, presently described.

The shackle section —2— is provided with an extension —3— which is rigidly secured by rivets or equivalent fastening means —4— to the adjacent end of the frame —A— to form practically a unitary part thereof.

In fact, the section —2— may, if desired, be made integral with the frame to extend downwardly therefrom and has its lower end broadened and substantially rectangular and its lower face substantially flat and horizontal.

The section —3— is preferably made in the form of a box except that one end facing the axle —B— is provided with an opening —5— for receiving the adjacent end of the spring —C—, the top of the box section —3— being substantially flat and horizontal and of substantially the same form as the lower end face of the section —2— against which it is adapted to be secured.

These shackle sections —2— and —3— are preferably forged from a strong and durable quality of steel or equivalent metal and their adjacent sides are provided with laterally projecting lugs or flanges —6— rigidly secured to each other by bolts —7— for holding the sections in fixed relation.

The lower side of the upper section —2— is provided with a central substantially rectangular recess —8— extending across the major portion of the area thereof for receiving a bearing block —9— of similar depth and area.

The top wall of the recess —8— and also the substantially flat while the marginal edges of the recess and corresponding marginal edges of the upper surface of the bearing block —9— are bearing block are slightly beveled or tapered upwardly at —10— so as to allow the bearing block to be firmly seated and held in the recess against lengthwise or lateral movement relatively to the shackle section —2—.

The bearing block —9— is provided in its lower side with a central lengthwise tooth rack —11— and downwardly and outwardly inclined bearing tracks —12— at opposite sides of the tooth rack for a purpose presently described.

The bottom of the lower shackle section —3— is provided with a central lug —13— projecting upwardly therefrom for receiving and retaining a bow spring —14— having a central aperture —15— for receiving the lug.

The spring —14— preferably consists of a concave-convex plate arranged with its convex side in engagement with the inner face of the bottom wall of the shackle section —3— and its opposite ends extending forwardly and rearwardly equal distances from the lug —13— in the direction of length of the spring and terminating in spaced relation to the end walls of said shackle section, as shown more clearly in Figure 3.

This spring also extends laterally to within relatively short distances of the side walls of the shackle section —3— and has its lower face substantially straight and adapted to rest upon the flat inner face of the bottom wall of the shackle section, as shown in Figure 2, said spring being sufficiently heavy and tensioned in such manner as to constantly hold the racks and pinions in intermeshing engagement and thereby to take up any wear between those parts.

The front and rear ends of the spring —14— are preferably curved outwardly and downwardly to receive and support the ends of an additional bearing block —16— which is of substantially the same area as the upper rack —9—, previously described.

The opposite ends of the lower face of the bearing block —16— are provided with upwardly and outwardly curved bearing surfaces —17— for receiving the adjacent outwardly and downwardly curved ends of the spring —14— so that when the bearing block —16— is mounted upon the spring, as shown in Figure 3, the inner end walls of the recesses —17— engaging the adjacent ends of the spring serve to hold the bearing block in operative position against forward or rearward movement while at the same time permitting vertical movement thereof under the action of the spring.

This bearing block —17— is provided in its upper side with a central lengthwise rack —18— and upwardly and outwardly inclined bearings —19—, said rack —18— being similar to the upper rack —11— but in opposed relation thereto, while the inclined bearing surfaces —19— are also similar to the bearings —12— but in opposed relation thereto, as shown more clearly in Figure 2.

The bearing blocks —9— and —16— are arranged in vertically spaced parallel relation with their tooth racks —11— and —18— and inclined bearings —12— and —19— facing each other, as shown in Figures 2 and 3.

The end of one of the springs —C— is extended through the opening —5— and into the lower shackle section —3— between and in spaced relation to the bearing blocks —4— and —16— for receiving and supporting an additional bearing block —20—.

That is, the bearing block —20— is provided with a central lengthwise opening —21— of substantially the same cross sectional area as the adjacent end of the spring —C—, said bearing block —20— being tightly fitted and secured by welding or any other suitable fastening means to the spring to form a substantially unitary part thereof adapted to move endwise therewith.

The upper side of the bearing block —20— is provided with a central lengthwise rack —22— and upwardly and outwardly inclined lengthwise bearings —23— at opposite sides of the rack —22— and in opposed relation to the upper inclined bearings —12— of the bearing block —9—.

In like manner, the lower side of the bearing block —20— is provided with a central lengthwise tooth rack —24— and downwardly and outwardly inclined lengthwise bearings —25— at opposite sides of the rack —24— and in opposed relation to the bearings —19— on the lower bearing block —16—.

The intermediate bearing block —20— is arranged midway between and in spaced relation to the upper and lower bearing blocks —9— and —16—, and is of considerably less length than the distance between the end walls of the lower shackle section —3— so as to leave ample space between the ends of the block and end walls of the housing to permit maximum endwise movement thereof under the action of the spring —C—.

A pinion —26— of hardened steel or equivalent non-resilient metal is interposed between and adapted to mesh with the rack —11— on the upper bearing block —9— and rack —22— of the intermediate bearing block —20— to establish positive rolling connection between said bearing blocks.

A similar pinion —27— is interposed between and adapted to mesh with the rack —18— of the lower bearing block —16— and rack —24— of the intermediate bearing block —20— to establish positive rolling connection between said bearing blocks.

The upper pinion —26— is provided with oppositely projecting coaxial end trunnions —28— which are tapered toward their outer ends to correspond to the inclined bearings —12— and —23— of the upper and intermediate bearing blocks —9— and —20— upon which the trunnions are adapted to roll.

In like manner, the lower pinion —27— is provided with opposite coaxial end trunnions —29— which are tapered to correspond to and to engage the inclined bearings —19— and —25— on the lower and intermediate bearing blocks —16— and —20— respectively for rolling engagement therewith.

It will be seen from the foregoing description that the shackle sections —2— and —2— constitute a housing or gear case for receiving the end of the spring together with the upper, lower and intermediate bearing blocks —9—, —16— and —20— and also the pinions —26— and —27— which, together with the rack —11—, —18—, 22 and 24 and pinions —26— and —27— constitute rack and pinion connections between the spring and housing to allow relative endwise movements of the spring and housing without appreciable friction, thereby reducing to a minimum the wear incidental to such relative movement.

It will also be noted that the spring —14— serves to yieldingly hold the racks and pinions in engagement with each other and at the same time acts as a shock absorber in that it tends to resist abrupt vertical thrusts upon the housing and vehicle spring.

It is, of course, understood that when the vehicle is in action, especially when traveling over rough roads, the center of the spring adjacent the wheel-supporting section —B— is vibrated vertically with greater or less frequency and amplitude and that it is this vibration which causes the end of the spring to slide back and forth in the housing —1—.

With this understanding, it is equally obvious that if the endwise reciprocal movement of the spring within the housing is retarded or gradually restrained, it would have the effect of reducing the vertical vibration of the spring or resultant rebound of the frame which, in some instances, is very desirable to serve as a shock absorber and for this purpose, I have contemplated replacing the circular pinions —26— and —27— with slightly elliptical pinions as —30—, shown in Figure 4, in which case the pinions would be normally arranged with the shorter axes extending vertically or their longer axes extending horizontally whereby a limited reciprocal endwise movement of the end of the spring would be permitted, but any excessive endwise movement would be retarded by the turning of the longer axes of the pinions toward a vertical position against the action of the spring —14—.

The inclined bearings —12—, —19—, —23— and —25— constitute straight lengthwise tracks along which the tapered trunnions —28— and —29— of the pinions —26— and —27— are adapted to roll.

This turning movement of the elliptical pinions would tend to retard the endwise movement of the spring in the housing and thereby serve as a shock absorber to prevent excessive vertical vibration of the central portion of the spring and frame of the chassis.

*Operation*

It is, of course, evident that the various members of the shackle may be assembled upon the frame and spring in different sequences. For example, the bearing block —20— may first be secured to the end of the spring and then the upper shackle section —2— with the bearing block —9— therein secured to the adjacent end of the chassis frame —A— followed by the placing of the upper pinion —26— in position midway between the ends of the blocks —9— and —20— in mesh with the opposed racks —11— and —22—.

The lower shackle section —3— with the bearing block —16— and pinion —27— centrally thereon may be placed from the underside upwardly and secured by means of the bolts —7— to the upper section to hold the lower pinion in proper mesh with the rack —24—, the entire device being then ready for use.

Or, on the other hand, the upper shackle section —2— may be permanently secured to or a part of the frame —A— in which case the upper bearing block —9— would be inserted in the recess —10— followed by the insertion of the upper pinion —26— in operative engagement with the racks —11— and —22—, it being assumed that the bearing block —20— has been previously secured to the spring.

The lower shackle section —3— with the parts —14—, —18— and —27— thereon may be secured by the bolts —7— to the upper section —2— to complete the assembly ready for operation.

When the machine is in use, it is evident that the vertical vibration of the spring will cause the bearing block —20— to be reciprocated endwise and also to change its angle vertically about a point midway between the adjacent sides of the pinions so that the spring really has two movements, a vertical rocking movement and also an endwise movement and in both cases the pinions will maintain positive engagement with their respective racks and will simply roll therealong according to the amount of endwise or vertical rocking movement.

It will thus be seen that with this positive rolling movement the friction between the spring and shackle housing is reduced to a minimum and enables the entire device to be used an indefinite period of time without lubrication, the effect of which is to render the entire device practically noiseless and free from the necessity of frequent adjustments as required in the usual swinging shackle type.

It will also be noted that the engagement of the tapered trunnions —29— with the corresponding inclined tracks —12— and —23— and —19— and —25— serve to hold the racks and pinions against relative lateral movement and at the same time affords a means to compensate for wear between the trunnions and tracks.

It is evident, however, that various changes may be made in the detail construction of the various parts of the shackle without departing from the spirit of the invention.

What I claim is:

1. A shackle for vehicle springs comprising a housing adapted to be secured to the chassis frame of the vehicle and provided with an opening for receiving one end of the spring, vertically spaced bearing blocks mounted on the vehicle spring and housing respectively and provided with central lengthwise toothed racks and straight lengthwise tracks at opposite sides of their respective racks, and a pinion meshing with said racks and provided with oppositely projecting trunnions engaging said tracks.

2. A shackle for vehicle springs comprising a housing adapted to be secured to the chassis frame of the vehicle and provided with an opening for receiving one end of the spring, a bearing block secured to the vehicle spring and having each of its lower and upper sides provided respectively with a central lengthwise toothed rack and lengthwise tracks at opposite sides of their respective racks, additional bearing blocks mounted within the housing below and above the vehicle spring and each provided with a central lengthwise toothed rack and tracks at opposite sides of their respective racks, and lower and upper pinions meshing with their corresponding racks and each provided with oppositely projecting end trunnions engaging the adjacent tracks, the mounting for the lower rack including a spring adapted to urge the lower bearing block upwardly to hold the racks and pinions in mesh and also to hold the tracks and trunnions in contact.

3. A shackle for vehicle springs as in claim 1 in which trunnions are tapered outwardly and the corresponding tracks are disposed in outwardly converging planes corresponding to the taper of the adjacent trunnions.

4. A shackle for vehicle springs comprising a housing adapted to be secured to the chassis frame of the vehicle and provided with an opening for receiving one end of the spring, and nonresilient rack and pinion bearings between the spring and housing the pinions being elliptical.

FRANK E. FISHER.